US012012538B2

(12) United States Patent
Li et al.

(10) Patent No.: US 12,012,538 B2
(45) Date of Patent: Jun. 18, 2024

(54) LUMINESCENT COMPOSITE MATERIAL AND PREPARATION METHOD THEREFOR

(71) Applicant: SHANGHAI JIAO TONG UNIVERSITY, Shanghai (CN)

(72) Inventors: Liang Li, Shanghai (CN); Bo Wang, Shanghai (CN)

(73) Assignee: SHANGHAI JIAO TONG UNIVERSITY, Shanghai (CN)

(*) Notice: Subject to any disclaimer, the term of this patent is extended or adjusted under 35 U.S.C. 154(b) by 668 days.

(21) Appl. No.: 17/134,381

(22) Filed: Dec. 26, 2020

(65) Prior Publication Data
US 2021/0198568 A1   Jul. 1, 2021

(30) Foreign Application Priority Data

Dec. 27, 2019  (CN) .......................... 201911377745.9

(51) Int. Cl.
C09K 11/66 (2006.01)
B01J 6/00 (2006.01)
B82Y 20/00 (2011.01)
B82Y 40/00 (2011.01)
C01D 17/00 (2006.01)
C09K 11/64 (2006.01)

(52) U.S. Cl.
CPC ............. C09K 11/665 (2013.01); B01J 6/001 (2013.01); C01D 17/00 (2013.01); C09K 11/64 (2013.01); B82Y 20/00 (2013.01); B82Y 40/00 (2013.01)

(58) Field of Classification Search
None
See application file for complete search history.

(56) References Cited

FOREIGN PATENT DOCUMENTS

| CN | 101503623 A | 8/2009 |
| CN | 102329618 A | 1/2012 |
| CN | 102391862 A | 3/2012 |
| CN | 102863963 A | 1/2013 |
| CN | 102295926 B | * 9/2013 |
| CN | 103881709 A | 6/2014 |
| CN | 108319077 A | 7/2018 |
| CN | 110564416 A | 12/2019 |

OTHER PUBLICATIONS

CN 102295926 B English translation (Year: 2013).*
Bo Wang, Congyang Zhang, Weilin Zheng, Qinggang Zhang, Zhongqiu Bao, Long Kong, and Liang Li; Large-Scale Synthesis of Highly Luminescent Perovskite Nanocrystals by Template-Assisted Solid-State Reaction at 800° C.; «Chem. Matr.» Dec. 26, 2019.

* cited by examiner

Primary Examiner — Jeffrey D Washville

(57) ABSTRACT

A luminescent composite material and a preparation method therefor. The luminescent composite material is prepared by mixing a precursor of a quantum dot and an oxide or a precursor thereof followed by high-temperature calcination. Compared with traditional methods, the method provided herein is a simple and low-cost synthesis process without using solvents, and is suitable for large-scale production. The luminescent composite material has high quantum efficiency, luminous intensity and luminous color purity and good photothermal stability, which can provide basis for theoretical research and applications of the luminescent composite material in high-performance photoluminescence devices, lasers and nonlinear optical devices.

10 Claims, 8 Drawing Sheets

LUMINESCENT COMPOSITE MATERIAL AND PREPARATION METHOD THEREFOR

CROSS-REFERENCE TO RELATED APPLICATIONS

This application claims the benefit of priority from Chinese Patent Application No. 201911377745.9, filed on Dec. 27, 2019. The content of the aforementioned application, including any intervening amendments thereto, is incorporated herein by reference in its entirety.

TECHNICAL FIELD

This disclosure relates to luminescent materials, and more particularly to a luminescent quantum dot/oxide composite material and a preparation method therefor.

BACKGROUND

Quantum dots, discovered in the 1980s, have aroused widespread interest in scientific research and industry due to their excellent photoelectric properties. Compared with traditional fluorescent materials, quantum dots have a fluorescence with a narrow peak width at half height, small particle size, no scattering loss and adjustable spectrum with size, and are considered to have brilliant prospects in the fields of display, lighting and biofluorescence labeling. Researchers worldwide have put a lot of resources in the research of quantum dot materials, which brings a continuous improvement of the optoelectronic performance of quantum dots and a series of prototype devices for related applications.

However, the traditional synthesis for quantum dot is complicated, in which a large amount of organic solvents are used. Some of the solvents are poisonous, and the wasted poisonous solvents cause huge pressure on the ecological environment. In addition, the precursors with high purity are required in the synthesis.

The above-mentioned problems lead to a high production cost of quantum dots and huge environmental pollution, which restricts the industrialization and application of the quantum dots.

SUMMARY

An object of the present disclosure is to provide a highly stable luminescent quantum dot/oxide composite material and a preparation method therefor. The method of the present disclosure is a solid-phase synthesis, which is obviously different from the traditional colloidal chemical synthesis. The method is a simple and low-cost synthesis process without using solvents, and the resulting luminescent material has high quantum efficiency, luminous intensity and luminous color purity and good photothermal stability. The method allows for industry production of the composite materials. The method of the present disclosure is extendable to a variety of quantum dot systems. In addition, the luminescence of the resulting luminescent material is adjustable. Therefore, the luminescent material is promising in photoluminescent devices.

In a first aspect, the present disclosure provides a luminescent composite material, comprising:
a quantum dot; and
an oxide;
wherein the oxide is a carrier of the quantum dot; the quantum dot is distributed on a surface of the oxide; and a molar ratio of the quantum dot to the oxide is 1:1-100.

In sonic embodiments, the molar ratio of the quantum dot to the oxide is 1:1-50.

In some embodiments, the oxide is selected from the group consisting of aluminum oxide, silicon dioxide, zirconium dioxide, titanium dioxide, tin dioxide, zinc oxide, molybdenum oxide, lanthanum oxide, cerium oxide, samarium oxide and combinations thereof.

In some embodiments, the luminescent composite material consists of a quantum dot and an oxide.

In some embodiments, the quantum dot has a nanocrystalline perovskite structure $ABX_3$, wherein A is selected from the group consisting of Li, Na, K, Rb, Cs, Ca, Sr and Ba; preferably A is selected from the group consisting of Li, Na, K, Rb and Cs; B is selected from the group consisting of Al, Ga, In, Ge, Sn, Pb, Cu; Mn; Sb and Bi; preferably B is selected from the group consisting of Ge, Sn and Pb; and X is a halogen, such as F, Cl, Br and I.

In some embodiments, the quantum dot has a nanocrystalline binary structure $D^{n+}Y^{n-}$, wherein n is an integer of 1-10; D is an element in group IIB or IIIA, such as Zn, Cd, Hg, Al, Ga and In; Y is an element in group VIA or VA, such as S, Se, Te, N, P, As and Sb; and a molar ratio of D to Y is 1:1.

In some embodiments, the quantum dot has a nanocrystalline structure of a ternary group IB-IIIA-VIA compound, which can be represented by a formula $G^+M^{3+}(N^{2-})_2$; wherein $G^+$ is $Cu^+$ or $Ag^+$; $M^{3+}$ is $In^{3+}$, $Ga^{3+}$ or $Al^{3+}$; $N^{2-}$ is $S^{2-}$ or $Se^{2-}$; and a molar ratio of $G^+$ to $M^{3+}$ to $N^{2-}$ is 0.5:0.5:1.

In a second aspect, the present disclosure provides a method for preparing a luminescent composite material, comprising:
(1) mixing at least one precursor of a quantum dot and an oxide or a precursor thereof in solid phase followed by grinding to obtain a uniform mixture; wherein a molar ratio of the at least one precursor of the quantum dot to the oxide or precursor thereof is 1:1-100;
(2) calcining the uniform mixture obtained in step (1) in a nitrogen atmosphere at 500-1000° C. for 5-60 min; and
(3) cooling the calcined mixture obtained in step (2) to room temperature; and grinding the mixture to obtain a luminescent composite material having a particle size less than 80 μm.

In a process of preparing the luminescent composite material, a calcination temperature used herein should ensure that the oxide is not melted, Because different oxides have different melting points, different calcination temperatures are adopted according to the different oxides or precursors thereof used in an embodiment. In practice, it is found that the luminescent material calcined at a temperature of 500-1000° C. has better performance.

In some embodiments, the method further comprises:
(4) annealing the grinded mixture obtained in step (3) in air at 400-600° C. for 5-60 min to obtain the annealed luminescent composite material.

In sonic embodiments, before step (1), the oxide or precursor thereof is calcined in a nitrogen atmosphere at 500-1000° C. for 5-60 min, and in step (2), a reducing atmosphere, for example produced from activated carbon is further used for calcination.

In some embodiments, before step (1), the oxide or precursor thereof is calcined in a nitrogen atmosphere at 500-1000° C. for 5-60 min, and the calcined oxide or precursor thereof is annealed in air at 400-600° C. for 5-60 min; and in step (2), a reducing atmosphere is further used for calcination.

In some embodiments, the at least one precursor of the quantum dot comprises an AX precursor and a $BX_2$ precursor; wherein A is selected from the group consisting of Li, Na, K, Rb, Cs, Ca, Sr and Ba; preferably A is selected from the group consisting of Li, Na, K, Rb and Cs; B is selected from the group consisting of Al, Ga, In, Ge, Sn, Pb, Cu, Mn, Sb and Bi; preferably B is selected from the group consisting of Ge, Sn and Pb; X is a halogen, such as F, Cl, Br and I; and a molar ratio of the AX precursor to the $BX_2$ precursor is 1:1.

In some embodiments, the at least one precursor of the quantum dot comprises a cation precursor and an anion precursor; a molar ratio of the cation precursor to the anion precursor is 1:1; the cation precursor provides a cation $D^{n+}$ for the quantum dot, wherein n is an integer of 1-10; the cation precursor is an oxide, a nitride, a phosphide, a sulfide, a selenide, a hydrochloride, an acetate, a carbonate, a sulfate, a phosphate, a nitrate or a hydrate of an element selected from the group consisting of Zn, Cd, Hg, Al, Ga and In; the anion precursor provides an anion $Y^{n-}$ for the quantum dot, wherein n is an integer of 1-10; and the anion precursor is a simple substance or an inorganic salt of an element selected from the group consisting of S, Se, Te, N, P, As, Sb; for example, the inorganic salt is tris(diethylamino)phosphine, tris(dimethyiamino)phosphine or tris(trimethylsilyl) phosphine.

In some embodiments, the at least one precursor of the quantum dot comprises:

a first precursor for providing a monovalent cation for the quantum dot;

a second precursor for providing a trivalent cation for the quantum dot; and a third precursor for providing a divalent anion for the quantum dot;

wherein the first precursor is selected from the group consisting of CuCl, CuBr, CuI, AgCl, AgBr, AgI, $Cu_2S$, $Cu_2Se$, $Ag_2S$, $Ag_2Se$, $Cu_2Te$, $Ag_2Te$ and combinations thereof the second precursor is an oxide, a sulfide, a selenide, a formate, an acetate, a propionate, a carbonate, a sulfate, a nitrate or a phosphate of a metal selected from the group consisting of In, Ga and Al; the third precursor is a simple substance or an inorganic salt of an element selected from the group consisting of S, Se and Te; and a molar ratio of the first precursor to the second precursor to the third precursor is 0.5:0.5:1.

In some embodiments, the oxide or precursor thereof is selected from the group consisting of an oxygen-containing aluminum compound, an oxygen-containing silicon compound, an oxygen-containing zirconium compound, an oxygen-containing titanium compound, an oxygen-containing tin compound, an oxygen-containing zinc compound, an oxygen-containing molybdenum compound, an oxygen-containing lanthanum compound, an oxygen-containing cerium compound and an oxygen-containing samarium compound.

In some embodiments, the oxygen-containing aluminum compound is selected from the group consisting of aluminum oxide, aluminum isopropoxide, aluminum oxalate, basic aluminum acetate, aluminum acetylacetonate, aluminum sulfate, aluminum nitrate, aluminum carbonate, aluminum phosphate, magnesium aluminum hydrotalcite and combinations thereof, preferably aluminum oxide, aluminum isopropoxide, basic aluminum acetate and aluminum oxalate.

In some embodiments, the oxygen-containing silicon compound is selected from the group consisting of silicon dioxide, tetramethyl silicate, tetraethyl silicate, sodium silicate, calcium silicate and combinations thereof, preferably silicon dioxide, calcium silicate, tetramethyl silicate and tetraethyl silicate.

In some embodiments, the oxygen-containing zirconium compound is selected from the group consisting of zirconium dioxide, zirconium propoxide, zirconium butoxide, zirconium acetate, zirconium acetyl acetonate, zirconium sulfate, zirconium nitrate, zirconium hydrogen phosphate and combinations thereof, preferably zirconium dioxide.

In some embodiments, the oxygen-containing titanium compound is selected from the group consisting of titanium dioxide, tetrapropyl titanate, tetrabutyl titanate, strontium titanate, zinc titanate and combinations thereof, preferably titanium dioxide, strontium titanate, zinc titanate and tetrapropyl titanate.

In some embodiments, the oxygen-containing tin compound is selected form the group consisting of tin (IV) dioxide, tin (IV) acetate, tin (IV) isopropoxide and combinations thereof, preferably tin (IV) dioxide.

In some embodiments, the oxygen-containing zinc compound is selected from the group consisting of zinc oxide, zinc citrate, zinc acetate, zinc oxalate, zinc carbonate, zinc sulfate, zinc phosphate, zinc nitrate and combinations thereof, preferably zinc oxide, zinc citrate, zinc acetate, zinc oxalate and zinc carbonate.

In some embodiments, the oxygen-containing molybdenum compound is selected from the group consisting of molybdenum oxide, molybdenum acetylacetonate, zinc molybdate, calcium molybdate, potassium molybdate and combinations thereof, preferably molybdenum oxide or zinc molybdate.

In some embodiments, the oxygen-containing lanthanum compound is selected from the group consisting of lanthanum oxide, lanthanum nitrate, lanthanum acetylacetonate, lanthanum carbonate, lanthanum acetate, lanthanum phosphate, lanthanum sulfate, lanthanum oxalate, lanthanum titanate and combinations thereof, preferably lanthanum oxide, lanthanum acetate, lanthanum carbonate, lanthanum oxalate and lanthanum titanate.

In some embodiments, the oxygen-containing cerium compound is selected from the group consisting of cerium oxide, cerium nitrate, cerium sulfate, cerium oxalate, cerium acetate, cerium carbonate, cerium phosphate and combinations thereof, preferably cerium oxide, cerium oxalate, cerium acetate and cerium carbonate.

In some embodiments, the oxygen-containing samarium compound is selected from the group consisting of samarium oxide, samarium nitrate, samarium acetate, samarium sulfate, samarium carbonate, samarium oxalate, samarium phosphate, samarium acetylacetonate and combinations thereof, preferably samarium oxide, samarium acetate, samarium carbonate and samarium oxalate.

The beneficial effects of the present disclosure are described as follows.

1. The preparation method of the present disclosure has simple operation, low cost and is suitable for industry production, which greatly reduces the production costs of quantum dots.

2. In the preparation process of the luminescent quantum dot/oxide composite materials, organic ligands are not required, and thus raw materials are saved and a subsequent purification process can be omitted.

3. Using the method as disclosed herein, the prepared luminescent quantum dot/oxide composite materials can have different particle sizes and composition. The composite materials have a high luminous intensity, and have a quantum yield of fluorescence up to 80-90% and a luminous wavelength covering the entire visible light region.

4. The luminescent quantum dot/oxide composite material prepared by the method of the present disclosure has high thermal stability.

5. The luminescent quantum dot/oxide composite material prepared by the method of the present disclosure has a narrow peak width at half height and high luminous color purity, which can meet the requirements of practical applications such as wide color gamut LED display, laser and nonlinear optics.

DETAILED DESCRIPTION OF EMBODIMENTS

As used herein, term "quantum dot" refers to a semiconductor nanostructure in which the excitons are constrained in all three spatial dimensions. The quantum dot is generally spherical or quasi-spherical with a diameter between 2-20 nm.

This disclosure will be thrther described below in detail with reference to the accompanying drawings and embodiments.

EXAMPLE 1

Preparation of a Luminescent Composite Material $CsPbBr_3/Al_2O_3$ a. (1) 158.5 mg (0.745 mmol) of CsBr, 273.4 mg (0.745 mmol) of $PbBr_2$ and 4.5648 g (22.35 mmol of aluminum isopropoxide were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill, so that a particle size of the mixture was less than 80 µm; and then the ground mixture was annealed in a box furnace at 500° C. for 10 min in air to obtain a luminescent composite material $CsPbBr_3/Al_2O_3$.

Figure 1:
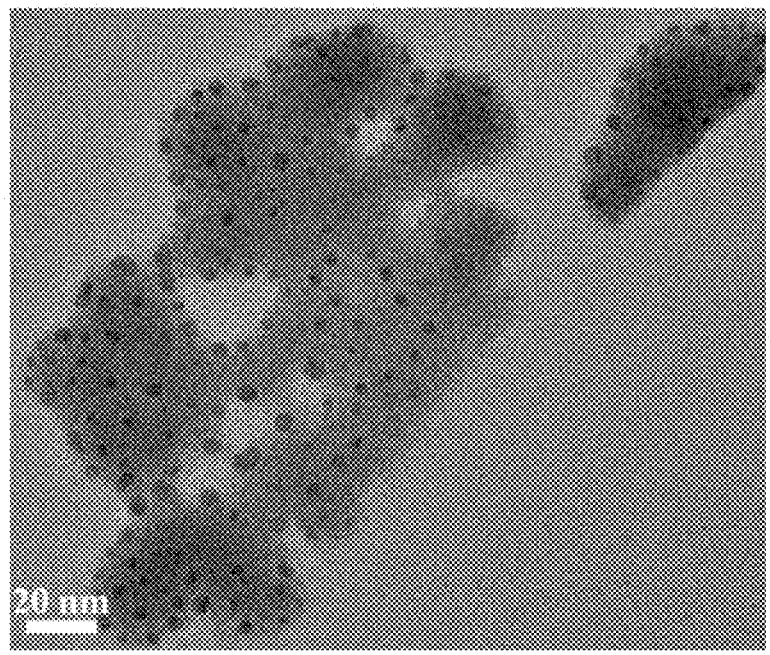
FIG. 1 is a TEM image of a luminescent composite material $CsPbBr_3/Al_2O_3$ in the powder form accordance with an embodiment of the present disclosure.
Figure 2:
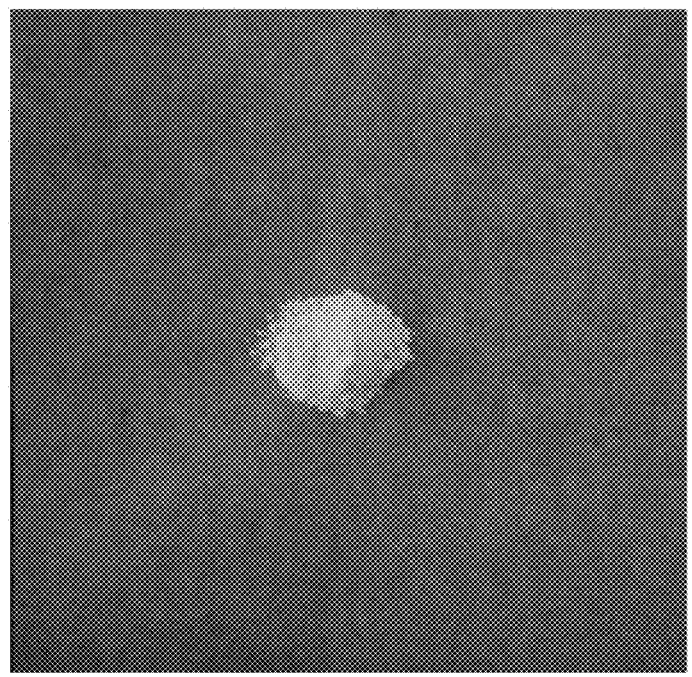
FIG. 2 is an image of a luminescent composite material $CsPbBr_3/Al_2O_3$ in accordance with an embodiment of the present disclosure.
Figure 3:
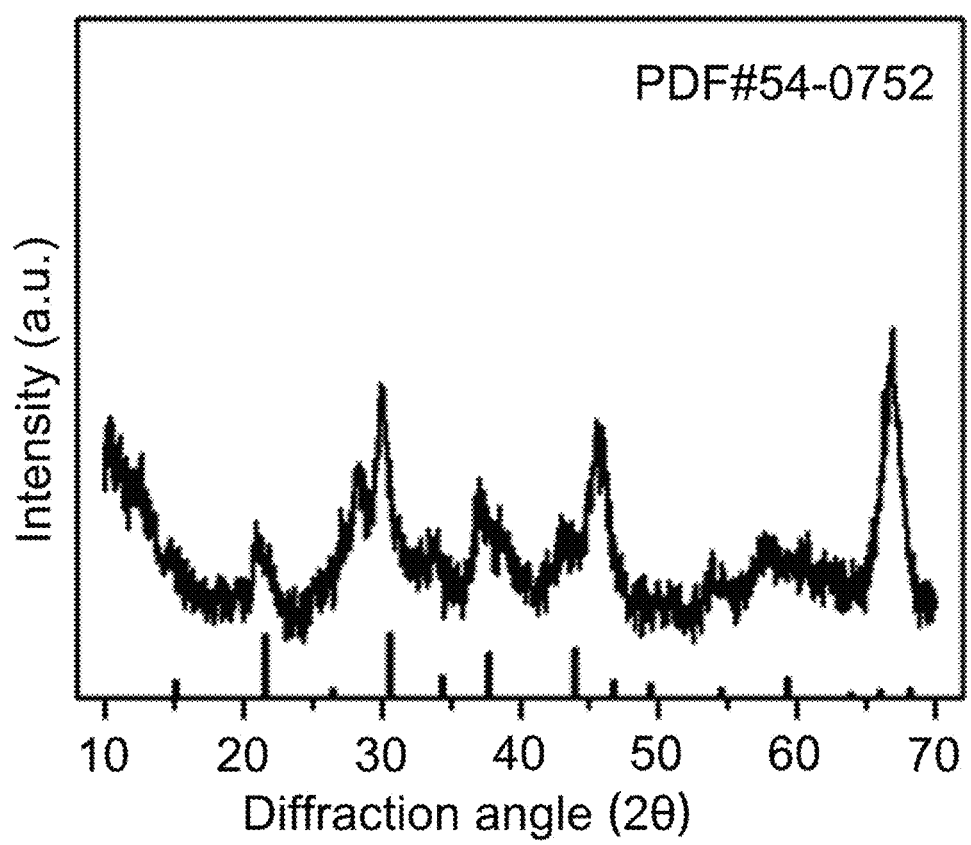
FIG. 3 is an XRD pattern of a luminescent composite material $CsPbBr_3/Al_2O_3$ in accordance with an embodiment of the present disclosure.
Figure 4:
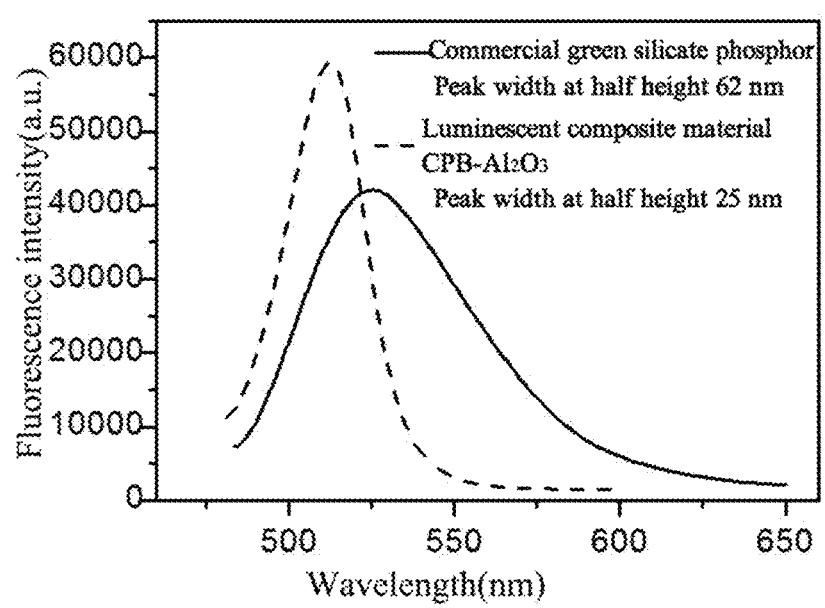
FIG. 4 shows a photoluminescence comparison between a luminescent composite material $CsPbBr_3/Al_2O_3$ and a commercial green silicate phosphor.
Figure 5:
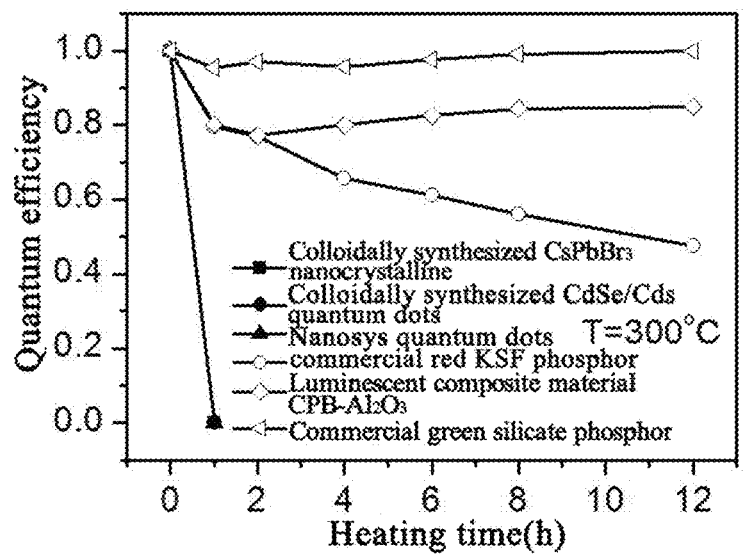
FIG. 5 shows thermal stabilities of a luminescent composite material $CsPbBr_3/Al_2O_3$, commercial phosphors and quantum dot films at 300° C.

The luminescent composite material $CsPbBr_3/Al_2O_3$ prepared in Example 1a was subjected to TEM, XRD, optical performance and thermal stability tests. FIG. 1 was a TEM image of the luminescent composite material $CsPbBr_3/Al_2O_3$, it was shown that the $CsPbBr_3$ nanocrystals were uniformly distributed on the surface of the $Al_2O_3$ matrix, with an average particle size of about 6 nm (small black particles in the FIG. 1). FIG. 2 was an optical photo of the luminescent composite material $CsPbBr_3/Al_2O_3$, which was in the form of green powder (since the photo was a grayscale photo, the color green was not shown in FIG. 2). FIG. 3 showed an XRD pattern of the luminescent composite material $CsPbBr_3/Al_2O_3$, and it was shown that the $CsPbBr_3$ nanocrystals had a cubic perovskite structure (PDF card 454-0752), which proved that the $CsPbBr_3$ nanocrystals were formed in the high-temperature calcination. FIG. 4 showed a photoluminescence comparison between the luminescent composite material $CsPbBr_3/Al_2O_3$ and a commercial green silicate phosphor (Intematix Co., Silicon Valley, California, USA). The green silicate phosphor was stable and low cost, and had a high fluorescence efficiency, which was greatly applied in business. It was shown that the fluorescence intensity of the luminescent composite material $CsPbBr_3/Al_2O_3$ obtained in this example was 40% higher than that of the commercial green silicate phosphor, and the peak width at half height of the luminescent composite material $CsPbBr_3/Al_2O_3$ was narrow, only 25 nm, which was much lower than that of commercial green silicate phosphor (62 nm). The luminescent composite material $CsPbBr_3/Al_2O_3$ with high fluorescence intensity and narrow peak width at half height would have higher energy efficiency and wider color gamut when sed in display. FIG. 5 showed thermal stabilities of the luminescent composite material $CsPbBr_3/Al_2O_3$, commercial phosphors and quantum dot films at 300° C. The colloidally synthesized quantum dot films cannot tolerate the high temperature of 300° C. that the color of $CsPbBr_3$ and CdSe/CdS turned black and their fluorescence was completely lost after heating for 1 h. After heated at 300° C. for 12 h, the quantum efficiency of the luminescent composite material $CsPbBr_3/Al_2O_3$ was still higher than 80% of the initial value, and the quantum efficiency of commercial red KSF phosphor (General Electric Company, US) dropped to 47% of the initial value. The quantum efficiency of commercial green silicate phosphor had hardly changed. The thermal stability of the luminescent composite material $CsPbBr_3/Al_2O_3$ prepared through high-temperature solid-state reaction was better than that of colloidally synthesized $CsPbBr_3$ nanocrystals and the KSF phosphor.

b. (1) 42.6 mg (0.2 mmol) of CsBr, 73.4 mg (0.2 mmol) of $PbBr_2$ and 1.6208 g (10 mmol) of basic aluminium acetate were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill, so that a particle size of the mixture was less than 80 μm; and then the ground mixture was annealed in a box furnace at 600° C. for 3 min in air to obtain a luminescent composite material $CsPbBr_3/Al_2O_3$.

Figure 6:
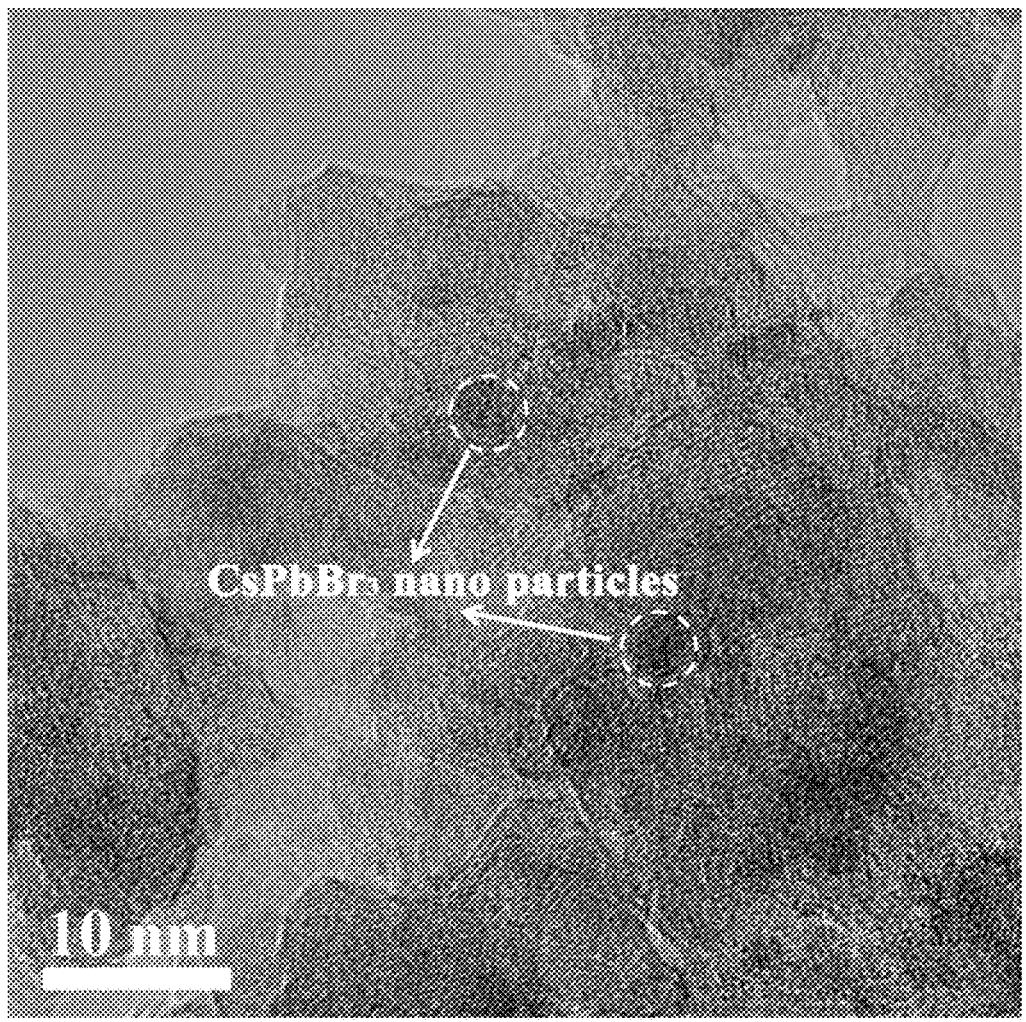
FIG. 6 is a TEM image of a luminescent composite material $CsPbBr_3/Al_2O_3$ using basic aluminum acetate as an aluminum source.
Figure 7:
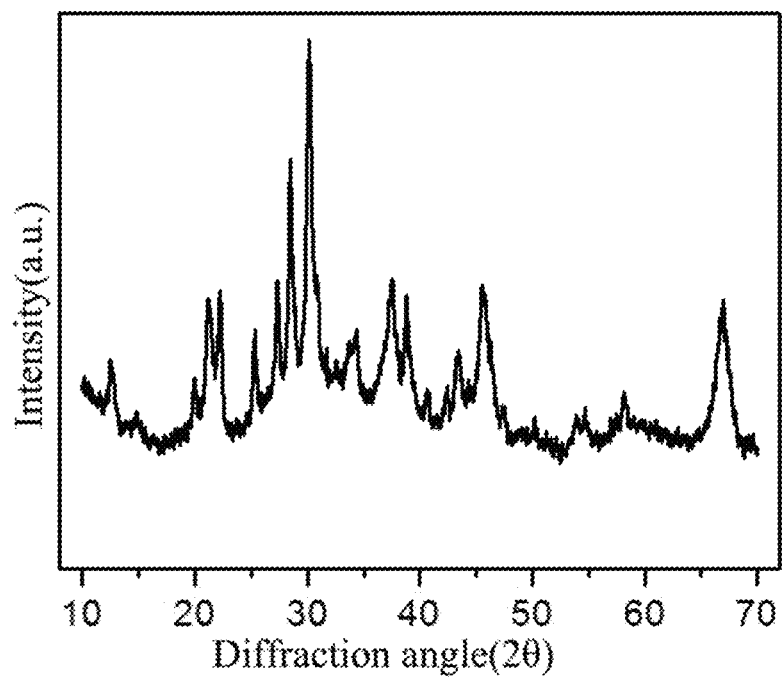
FIG. 7 is an XRD pattern of a luminescent composite material $CsPbBr_3/Al_2O_3$ using basic aluminum acetate as an aluminum source.
Figure 8:
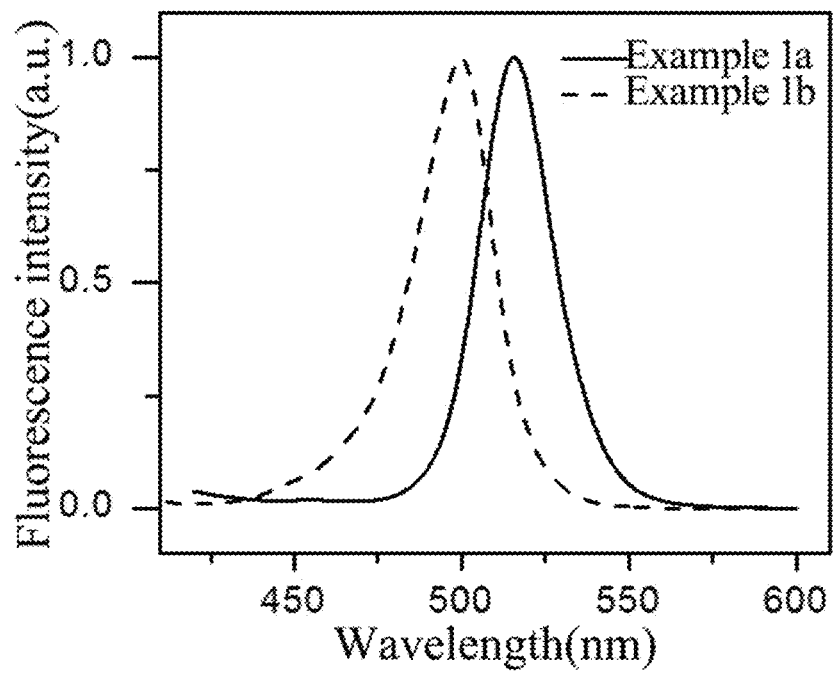
FIG. 8 shows fluorescence emission peaks of luminescent composite materials $CsPbBr_3/Al_2O_3$ with different ratio of raw materials.

The luminescent composite material $CsPbBr_3/Al_2O_3$ prepared in Example 1b was subjected to TEM, XRD and fluorescence performance tests. FIG. 6 was a TEM image of the luminescent composite material $CsPbBr_3/Al_2O_3$. It was shown that the $CsPbBr_3$ nanocrystals were uniformly distributed on the surface of the $Al_2O_3$ matrix, with a particle size of about 3 nm (two small black particles were circled for observation). FIG. 7 was an XRD pattern of the luminescent composite material $CsPbBr_3/Al_2O_3$. FIG. 8 showed the fluorescence pattern of the luminescent composite material $CsPbBr_3/Al_2O_3$ prepared in Examples 1a and 1b. It can be seen that changing the ratio of raw materials can adjust the position of the fluorescence emission peak of the nanocrystal. TEM and fluorescence tests showed that changing the ratio of raw materials can adjust the nanocrystalline particle size and fluorescence emission peak position.

c. (1) 212.8 mg (1 mmol) of CsBr, 367 mg (1 mmol) of $PbBr_2$ and 1.5901 g (5 mmol) of aluminium oxalate were added into a planetary ball mill and were fully ground to obtain a uniform mixture;

(2) the uniform mixture obtained in step (1) was spread in an alumina crucible, and then was placed in a tube furnace for calcination at 600° C. for 30 min under a nitrogen atmosphere; and (3) the calcined mixture obtained in step (2) was cooled to room temperature, and ground in a planetary ball mill to obtain a luminescent composite material $CsPbBr_3/Al_2O_3$ with a particle size less than 80 μm.

Figure 9:
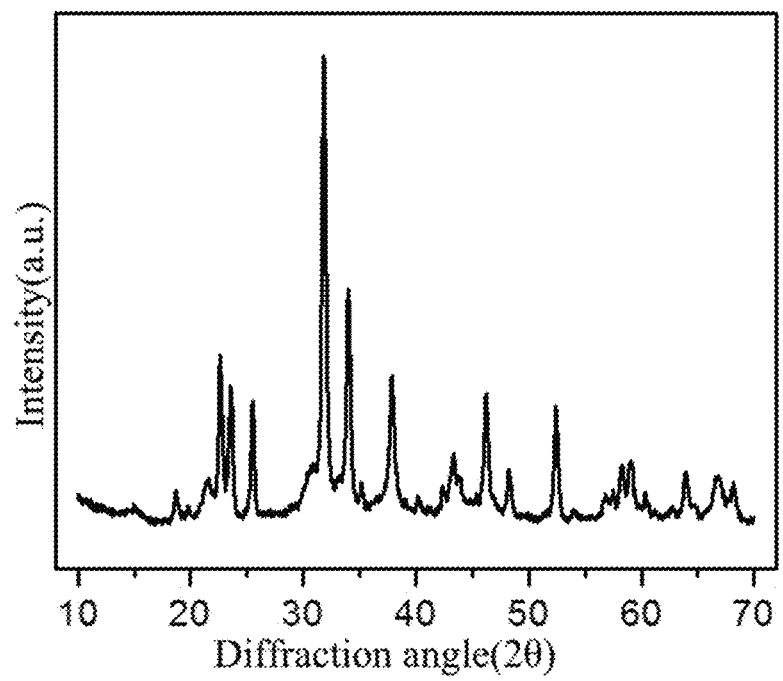
FIG. 9 is an XRD pattern of a luminescent composite material $CsPbBr_3/Al_2O_3$ using aluminum oxalate as an aluminum source.
Figure 10:
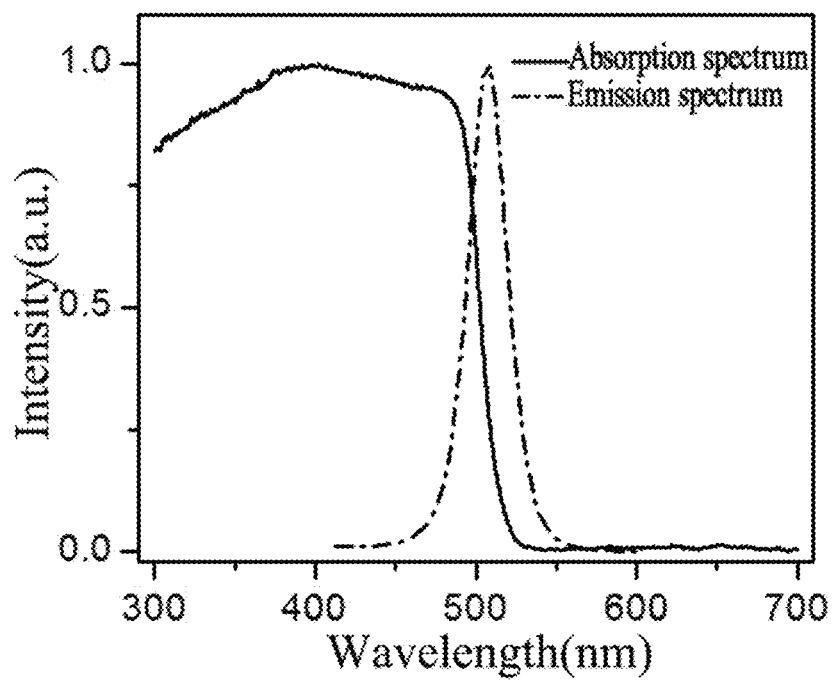
FIG. 10 shows an absorption spectrum and emission spectrum of a luminescent composite material $CsPbBr_3/Al_2O_3$ using aluminum oxalate as an aluminum source.

The luminescent composite material $CsPbBr_3/Al_2O_3$ prepared in Example 1c was subjected to XRD and optical performance tests. FIG. 9 was an XRD pattern of the luminescent composite material $CsPbBr_3/Al_2O_3$. FIG. 10 was an absorption and fluorescence pattern of the luminescent composite material $CsPbBr_3/Al_2O_3$.

d. (1) Aluminum isopropoxide powder was spread in an alumina crucible, and was placed in a tube furnace for calcination at 800° C. for 10 min under a nitrogen atmosphere;

(2) 380 g of the calcined aluminum isopropoxide powder product obtained in step (1), 79.3 g of CsBr and 136.6 g of $PbBr_2$ were added into a planetary ball mill and were fully ground to obtain a uniform mixture;

(3) the uniform mixture obtained in step (2) was spread in an alumina crucible, and then was placed in a tube furnace for calcination at 800° C. for 10 min under a nitrogen atmosphere; and (4) the calcined mixture obtained in step (3) was cooled to room temperature, and ground in a planetary ball mill, so that a particle size of the mixture was less than 80 μm; and then the ground mixture was annealed in a box furnace at 450° C. for 30 min in air to obtain a luminescent composite material $CsPbBr_3/Al_2O_3$.

Figure 11:
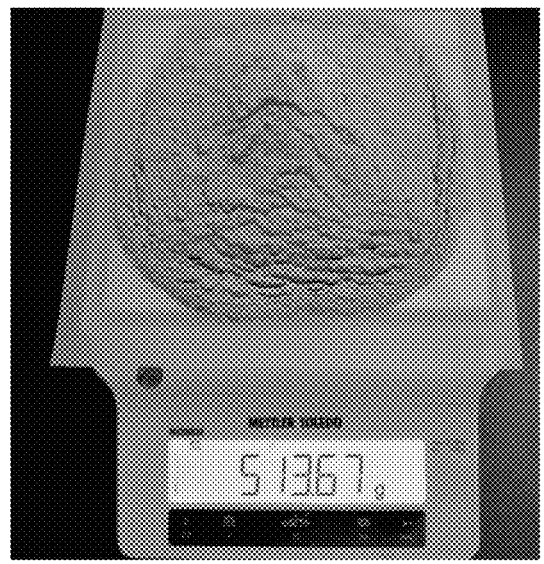
FIG. 11 is a picture of a luminescent composite material $CsPbBr_3/Al_2O_3$ in the powder form in accordance with an embodiment of the present disclosure.

FIG. 11 was a photo of luminescent composite material $CsPbBr_3/Al_2O_3$ prepared in Example 1d. The high-temperature solid-phase synthesis method was simple, and was easy to implement and expand production.

e. (1) Aluminum isopropoxide powder was spread in an alumina crucible, and was placed in a tube furnace for calcination at 800° C. for 10 min under a nitrogen atmosphere; then the calcined aluminum isopropoxide powder was annealed in a box furnace at 500° C. for 60 min in air:

(2) 380 g of the aluminum isopropoxide powder product obtained in step (1), 79.3 g of CsBr and 136.6 g of $PbBr_2$ were added into a planetary ball mill and were fully ground to obtain a uniform mixture;

(3) the uniform mixture obtained in step (2) was placed in a tube furnace for calcination in a nitrogen atmosphere at 800° C. for 10 min under a protection of a reducing atmosphere produce from adequate activated carbon; and (4) the calcined mixture obtained in step (3) was cooled to room temperature, and ground in a planetary ball mill to obtain a luminescent composite material $CsPbBr_3/Al_2O_3$ with a particle size less than 80 μm.

f. (1) 1.33 g (6.25 mmol) of CsBr, 2.294 g (6.25 mmol) of $PbBr_2$ and 19.125 g (187.5 mmol) of aluminum oxide were added into a planetary ball mill and were fully ground to obtain a uniform mixture;

(2) the uniform mixture obtained in step (1) was spread in an alumina crucible, and then was placed in a tube furnace for calcination at 700° C. for 30 min under a nitrogen atmosphere; and (3) the calcined mixture obtained in step (2) was cooled to room temperature, and ground in a planetary ball mill to obtain a luminescent composite material $CsPbBr_3/Al_2O_3$ with a particle size less than 80 μm.

g. (1) 106.4 mg (0.5 mmol) of CsBr, 183.5 mg (0.5 mmol) of $PbBr_2$ and 1.45 g (22.35 mmol) of hydrotalcite were added into a planetary ball mill and were fully ground to obtain a uniform mixture;

(2) the uniform mixture obtained in step (1) was spread in an alumina crucible, and then was placed in a box furnace for calcination at 650° C. for 10 min in air; and (3) the calcined mixture obtained in step (2) was cooled to room temperature, and ground in a planetary ball mill to obtain a luminescent composite material $CsPbBr_3/Al_2O_3$ with a particle size less than 80 μm.

EXAMPLE 2

Preparation of a Luminescent Composite Material $CsPbBr_3/SiO_2$.

a. (1) 106.4 mg (0.5 mmol) of CsBr, 183.5 mg (0.5 mmol) of $PbBr_2$ and 901.2 (15 mmol) of silicon dioxide were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill to obtain a luminescent composite material $CsPbBr_3/SiO_2$ with a particle size less than 80 μm.

b. (1) 53.2 mg (0.25 mmol) of CsBr, 91.7 mg (0.25 mmol) of $PbBr_2$ and 1.13 mL (7.5 mmol) of tetramethyl silicate were mixed and added with 10 mL of pure water to react under magnetic stirring for 4 h, so that the tetramethyl silicate was completely hydrolyzed;

(2) the mixture obtained in step (1) was dried at 110° C. for 4 h to completely remove moisture. The dried mixture was spread in an alumina crucible, and then was placed in a box furnace for calcination at 600° C. for 30 min in air; and (3) the calcined mixture obtained in step (2) was cooled to room temperature, and ground in a planetary ball mill to obtain a luminescent composite materia $CsPbBr_3/SiO_2$ with a particle size less than 80 μm,

EXAMPLE 3

Preparation of a Luminescent Composite Material $CsPbBr_3/ZrO_2$ (1) 53.2 mg (0.25 mmol) of CsBr, 91.7 mg (0.25 mmol) of $PbBr_2$ and 924.1 mg (7.5 mmol) of zirconium dioxide were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill to obtain a luminescent composite material $CsPbBr_3/ZrO_2$ with a particle size less than 80 μm.

EXAMPLE 4

Preparation of a Luminescent Composite Material $CsPbBr_3/TiO_2$ a. (1) 53.2 mg (0.25 mmol) of CsBr, 91.7 mg (0.25 mmol) of $PbBr_2$ and 599 mg (7.5 mmol) of titanium dioxide were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill to obtain a luminescent composite material $CsPbBr_3/TiO_2$ with a particle size less than 80 μm.

b. (1) 53.2 mg (0.25 mmol) of CsBr, 91.7 mg (0.25 mmol) of $PbBr_2$ and 2.23 mL (7.5 mmol) of titanium n-propoxide were mixed and added with 10 mL of pure water to react under magnetic stirring for 4 h, so that the tetramethyl silicate was completely hydrolyzed;

(2) the mixture obtained in step (1) was dried at 110° C. for 4 h to completely remove moisture. The dried mixture was spread in an alumina crucible, and then was placed in a box furnace for calcination at 600° C. for 30 min in air; and (3) the calcined mixture obtained in step (2) was cooled to room temperature, and ground in a planetary ball mill to obtain a luminescent composite material $CsPbBr_3/TiO_2$ with a particle size less than 80 μm.

EXAMPLE 5

Preparation of a Luminescent Composite Material $CsPbBr_3/SnO_2$ (1) 53.2 mg (0.25 mmol) of CsBr, 91.7 mg (0.25 mmol) of $PbBr_2$ and 1.13 g (7.5 mmol) of tin oxide were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill to obtain a luminescent composite material $CsPbBr_3/SnO_2$ with a particle size less than 80 μm.

EXAMPLE 6

Preparation of a Luminescent Composite Material $CsPbBr_3/ZnO$ a. (1) 53.2 mg (0.25 mmol) of CsBr, 91.7 mg, (0.25 mmol) of $PbBr_2$ and 610.4 mg (7.5 mmol) of zinc oxide were added into a planetary ball mill and were fully ground to obtain a uniform mixture;

(2) the uniform mixture obtained in step (1) was spread in an alumina crucible, and then was placed in a box furnace for calcination at 700° C. for 30 min in air; and (3) the calcined mixture obtained in step (2) was cooled to room temperature, and ground in a planetary ball mill to obtain a luminescent composite material $CsPbBr_3/ZnO$ with a particle size less than 80 μm.

b. (1) 53.2 mg (0.25 mmol) of CsBr, 91.7 mg (0.25 mmol) of $PbBr_2$ and 4.5776 g (7.5 mmol) of zinc citrate were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill, so that a particle size of the mixture was less than 80 μm; and then the ground mixture was annealed in a box furnace at 500° C. for 10 min in air to obtain a luminescent composite material $CsPbBr_3/ZnO$.

EXAMPLE 7

Preparation of a Luminescent Composite Material $CsPbBr_3/Mo_2O_3$ a. (1) 53.2 mg (0.25 mmol) of CsBr, 91.7 mg (0.25 mmol) of $PbBr_2$ and 1.0795 g (7.5 mmol) of aluminum isopropoxide were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill to obtain a luminescent composite material $CsPbBr_3/Mo_2O_3$ with a particle size less than 80 μm.

b. (1) 53.2 mg (0.25 mmol) of CsBr, 91.7 mg (0.25 mmol) of PbBr$_2$ and 1.0795 g (7.5 mmol) of zinc molybdate were added into a planetary ball mill and were fully ground to obtain a uniform mixture;

(2) the uniform mixture obtained in step (1) was spread in an alumina crucible, and then was placed in a box furnace for calcination at 700° C. for 30 min in air; and (3) the calcined mixture obtained in step (2) was cooled to room temperature, and ground in a planetary ball mill to obtain a luminescent composite material CsPbBr$_3$/ZnMo$_2$O$_4$ with a particle size less than 80 μm.

EXAMPLE 8

Preparation of a Luminescent Composite Material CsPbBr$_3$/La$_2$O$_3$ a. (1) 53.2 mg (0.25 mmol) of CsBr, 91.7 mg (0.25 mmol) of PbBr$_2$ and 2.4438 g (7.5 mmol) of lanthanum oxide were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill to obtain a luminescent composite material CsPbBr$_3$/La$_2$O$_3$ with a particle size less than 80 μm.

b. (1) 53.2 ing (0.25 mmol) of CsBr, 91.7 mg (0.25 mmol) of PbBr$_2$ and 2.5054 g (7.5 mmol) of lanthanum acetate were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill to obtain a luminescent composite material CsPbBr$_3$/La$_2$O$_3$ with a particle size less than 80 μm,

EXAMPLE 9

Preparation of a Luminescent Composite Material CsPbBr$_3$/Ce$_2$O$_3$ a. (1) 53.2 mg (0.25 mmol) of CsBr, 91.7 mg (0.25 mmol) of PbBr$_2$ and 1.2908 g (7.5 mmol) of cerium oxide were added into a planetary ball mill and were fully, ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill to obtain a luminescent composite material CsPbBr$_3$/Ce$_2$O$_3$ with a particle size less than 80 μm.

b. (1) 53.2 mg (0.25 mmol) of CsBr, 91.7 mg (0.25 mmol) of PbBr$_2$ and 4.0822 g (7.5 mmol) of cercus oxalate were added into a planetary ball mill and were fully ground to obtain a uniform mixture;

(2) the niform mixture obtained in step (1) was spread in an alumina crucible, and then was placed in a box furnace for calcination at 900° C. for 5 min in air; and (3) the calcined mixture obtained in step (2) was cooled to room temperature, and ground in a planetary ball mill to obtain a luminescent composite material CsPbBr$_3$/Ce$_2$O$_3$ with a particle size less than 80 μm.

EXAMPLE 10

Preparation of a Luminescent Composite Material CsPbBr$_3$/Sm$_2$O$_3$ (1) 53.2 mg (0.25 mmol) of CsBr, 91.7 mg (0.25 mmol) of PbBr$_2$ and 2.6153 g (7.5 mmol) of samarium oxide were added into a planetary ball mill and were fully ground to obtain a uniform mixture;

(2) the uniform mixture obtained in step (1) was spread in an alumina crucible, and then was placed in a tube furnace for calcination at 500° C. for 60 min under a nitrogen atmosphere; and (3) the calcined mixture obtained in step (2) was cooled to room temperature, and ground in a planetary ball mill to obtain a luminescent composite material CsPbBr$_3$/Sm$_2$O$_3$ with a particle size less than 80 μm.

EXAMPLE 11

Preparation of a Luminescent Composite Material CsPbCl$_3$/Al$_2$O$_3$ a. (1) 42.1 mg (0.25 mmol) of CsCl, 69.5 mg (0.25 mmol) of PbCl$_2$ and 1.5318 g (7.5 mmol) of aluminum isopropoxide were added into a planetary hall mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill, so that a particle size of the mixture was less than 80 m; and then the ground mixture was annealed in a box furnace at 500° C. for 10 min in air to obtain a luminescent composite material CsPbCl$_3$/Al$_2$O$_3$.

Figure 12:
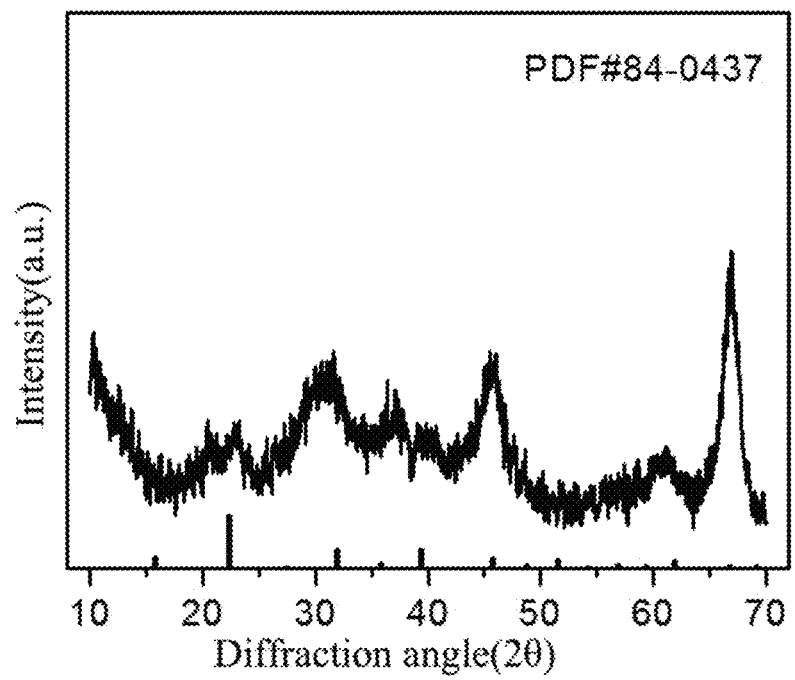
FIG. 12 is an XRD pattern of a luminescent composite material $CsPbCl_3/Al_2O_3$ in accordance with an embodiment of the present disclosure.
Figure 13:
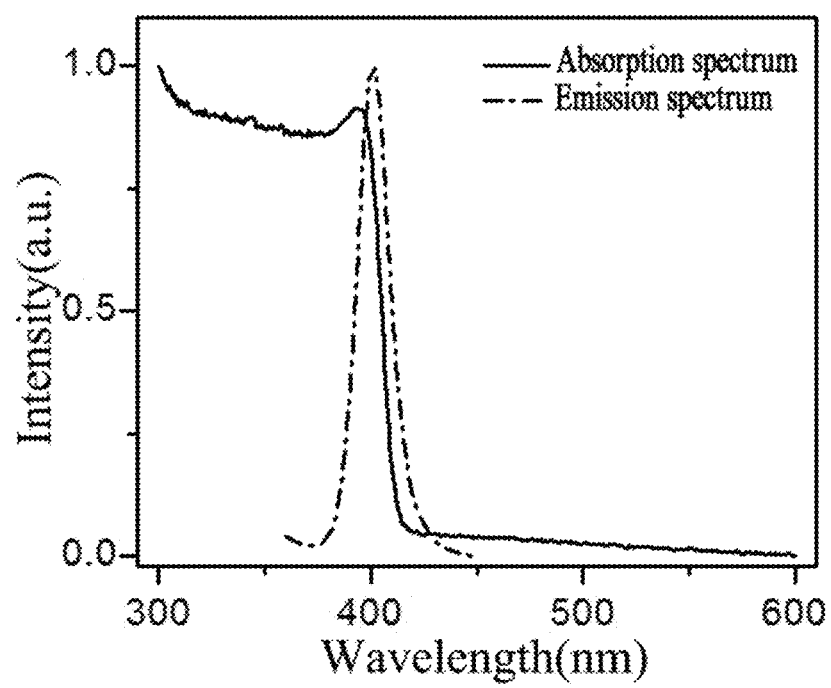
FIG. 13 shows an absorption spectrum and emission spectrum of a luminescent composite material $CsPbCl_3/Al_2O_3$ in accordance with an embodiment of the present disclosure.

The luminescent composite material CsPbCl$_3$/Al$_2$O$_3$ prepared in Example 11a was subjected to XRD and optical performance tests. FIG. 12 was an XRD pattern of the luminescent composite material CsPbCl$_3$/Al$_2$O$_3$. FIG. 13 was an absorption and fluorescence pattern of the luminescent composite material CsPbCl$_3$/Al$_2$O$_3$.

b. (1) 168.4 mg (1 mmol) of CsCl, 278.1 mg (1 mmol) of PbCl$_2$ and 810.4 g (5 mmol) of basic aluminium acetate were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill, so that a particle size of the mixture was less than 80 μm, and then the ground mixture was annealed in a box furnace at 500° C. for 10 min in air to obtain a luminescent composite material CsPbCl$_3$/Al$_2$O$_3$.

c, (1) 42.1 mg (0.25 mmol) of CsCl, 69.5 mg (0.25 mmol) of PbCl$_2$ and 2.3852 g (7.5 mmol) of aluminum oxalate were added into a planetary ball mill and were fully ground to obtain a uniform mixture;

(2) the uniform mixture obtained in step (1) was spread in an alumina crucible, and then was placed in a tube furnace for calcination at 700° C. for 30 min under a nitrogen atmosphere; and (3) the calcined mixture obtained in step (2) was cooled to room temperature, and ground in a planetary ball mill to obtain a luminescent composite material $CsPbCl_3/Al_2O_3$ with a particle size less than 80 μm.

EXAMPLE 12

Preparation of a Luminescent Composite material $CsPbI_3/Al_2O_3$ a. (1) 65.0 mg (0.25 mmol) of CsI, 115.3 mg (0.25 mmol) of $PbI_2$ and 1.5318 g (7.5 mmol) of aluminum isopropoxide were added into a planetary ball mill and were fully ground to obtain a uniform mixture;

(2) the uniform mixture obtained in step (1) was spread in an alumina crucible, and then was placed in a tube furnace for calcination at 800° C.' for 10 min under a nitrogen atmosphere; and (3) the calcined mixture obtained in step (2) was cooled to room temperature, and ground in a planetary ball mill, so that a particle size of the mixture was less than 80 μm; and then the ground mixture was annealed in a box furnace at 500° C. for 10 min in air to obtain a luminescent composite material $CsPbI_3/Al_2O_3$.

Figure 14:
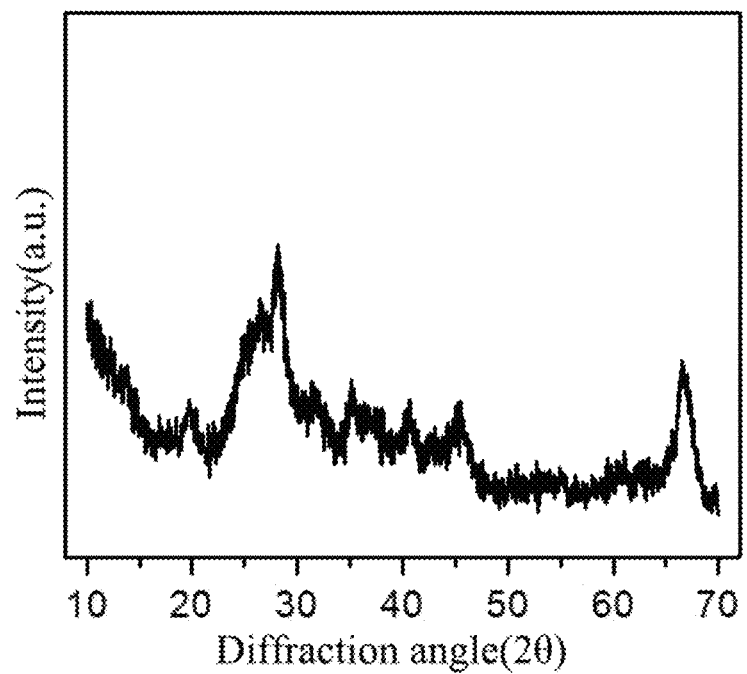
FIG. 14 is an XRD pattern of a luminescent composite material $CsPbI_3/Al_2O_3$ in accordance with an embodiment of the present disclosure.
Figure 15:
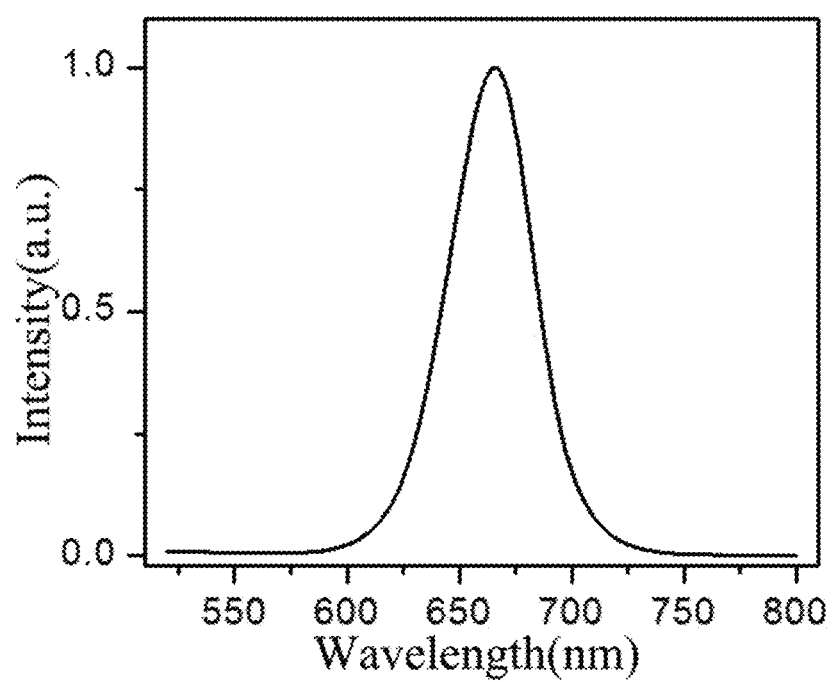
FIG. 15 is an emission spectrum of a luminescent composite material $CsPbI_3/Al_2O_3$ in accordance with an embodiment of the present disclosure.

The luminescent composite material $CsPbI_3/Al_2O_3$ prepared in Example 11a was subjected to XRD and optical performance tests. FIG. 14 was an XRD pattern of the luminescent composite material $CsPbI_3/Al_2O_3$. FIG. 15 was an absorption and fluorescence pattern of the luminescent composite material $CsPbI_3/Al_2O_3$.

b. (1) 259.8 mg (1 mmol) of CsI, 461.0 mg (1 mmol) of $PbI_2$ and 810.4 mg (5 mmol) of basic aluminium acetate were added into a planetary ball mill and were fully ground to obtain a uniform mixture;

(2) the uniform mixture obtained in step (1) was spread in an alumina crucible, and then was placed in a tube furnace for calcination at 800° C. for 10 min under a nitrogen atmosphere; and (3) the calcined mixture obtained in step (2) was cooled to room temperature, and ground in a planetary ball mill, so that a particle size of the mixture was less than and then the ground mixture was annealed in a box furnace at 500° C. for 10 min in air to obtain a luminescent composite material $CsPbI_3/Al_2O_3$.

c. (1) 65.0 mg (0.25 mmol) of CsI, 115.3 mg (0.25 mmol) of PbI and 2.3852 g (7.5 mmol) of aluminum oxalate were added into a planetary ball mill and were fully ground to obtain a uniform mixture;

(2) the uniform mixture obtained in step (1) was spread in an alumina crucible, and then was placed in a tube furnace for calcination at 700° C. for 30 min under a nitrogen atmosphere; and (3) the calcined mixture obtained in step (2) was cooled to room temperature, and ground in a planetary ball mill to obtain a luminescent composite material $CsPbI_3/Al_2O_3$ with a particle size less than 80 μm.

EXAMPLE 13

Preparation of a Luminescent Composite Material $CdTe/Al_2O_3$ a. (1) Aluminum isopropoxide powder was spread in an alumina crucible, and was placed in a tube furnace for calcination at 800° C. for 10 min under a nitrogen atmosphere; then the calcined aluminum isopropoxide powder was annealed in a box furnace at 500° C. for 60 min in air;

(2) 380 mg of the calcined aluminum isopropoxide powder product obtained in step (1) and 89.5 mg (0.373 mmol) of bulk CdTe were added into a planetary ball mill and were fully ground to obtain a uniform mixture;

(3) the uniform mixture obtained in step (2) was placed in a tube furnace in a nitrogen atmosphere for calcination at 600° C. for 10 min under a protection of a reducing atmosphere produced from adequate activated carbon; and (4) the calcined mixture obtained in step (3) was cooled to room temperature, and ground in a planetary ball mill to obtain a luminescent composite material $CdTe/Al_2O_3$ with a particle size less than 80 μm.

h. (1) Aluminum isopropoxide powder was spread in an alumina crucible, and was placed in a tube furnace for calcination at 800° C. for 10 min under a nitrogen atmosphere; then the calcined aluminum isopropoxide powder was annealed in a box furnace at 500° C. for 60 min in air;

(2) 380 mg of the calcined aluminum isopropoxide powder product obtained in step (1), 47.8 mg (0.373 mmol) of CdO and 7.6 mg (0.373 mmol) of tellurium powder were added into a planetary ball mill followed and were fully ground to obtain a uniform mixture;

(3) the uniform mixture obtained in step (2) vas placed in a tube furnace in a nitrogen atmosphere for calcination at 800° C. for 10 min under a protection of a reducing atmosphere produced from adequate activated carbon; and (4) the calcined mixture obtained in step (3) was cooled to room temperature, and ground in a planetary ball mill to obtain a luminescent composite material $CdTe/Al_2O_3$ with a particle size less than 80 μm.

EXAMPLE 14

Preparation of a Luminescent Composite Material $CdS/Al_2O_3$.

a. (1) Aluminum isopropoxide powder was spread in an alumina crucible, and was placed in a tube furnace for calcination at 800° C. for 10 min under a nitrogen atmosphere; then the calcined aluminum isopropoxide powder was annealed in a box furnace at 500° C. for 60 min in air;

(2) 380 mg of the calcined aluminum isopropoxide powder product obtained in step (1) and 53.9 mg (0.373 mmol) of bulk CdS were added into a planetary ball mill and were fully ground to obtain a uniform mixture;

(3) the uniform mixture obtained in step (2) was placed in a tube furnace in a nitrogen atmosphere for calcination at 600° C. for 10 min under a protection of a reducing atmosphere produced from adequate activated carbon protection; and (4) the calcined mixture obtained in step (3) was cooled to room temperature, and ground in a planetary ball mill to obtain a luminescent composite material $CdS/Al_2O_3$ with a particle size less than 80 μm.

b. (1) Aluminum isopropoxide powder was spread in an alumina crucible, and was placed in a tube furnace for calcination at 800° C. for 10 min under a nitrogen atmosphere; then the calcined aluminum isopropoxide powder was annealed in a box furnace at 500° C. for 60 min in air;

(2) 380 mg of the calcined aluminum isopropoxide powder product obtained in step (1), 47.8 mg (0.373 mmol) of CdO and 12.0 mg (0.373 mmol) of sulfur powder were added into a planetary ball mill and were fully ground to obtain a uniform mixture;

(3) the uniform mixture obtained in step (2) was placed in a tube furnace under a nitrogen atmosphere for calcination at 800° C. for 10 min under a protection of a reducing atmosphere produced from adequate activated carbon; and (4) the calcined mixture obtained in step (3) was cooled to room temperature, and ground in a planetary ball mill to obtain a luminescent composite material CdS/Al$_2$O$_3$ with a particle size less than 80 μm.

EXAMPLE 15

Preparation of a Luminescent Composite Material InP/Al$_2$O$_3$ a. (1) Aluminum isopropoxide powder was spread in an alumina crucible, and was placed in a tube furnace for calcination at 800° C. for 10 min under a nitrogen atmosphere; then the calcined aluminum isopropoxide powder was annealed in a box furnace at 500° C. for 60 min in air;

(2) 380 mg of the calcined aluminum isopropoxide powder product obtained in step (1) and 54.4 mg (0.373 mmol) of bulk InP were added into a planetary ball mill and were fully ground to obtain a uniform mixture;

(3) the uniform mixture obtained in step (2) was placed in a tube furnace under a nitrogen atmosphere for calcination at 600° C. for 10 min under a protection of a reducing atmosphere produced from adequate activated carbon; and, (4) the calcined mixture obtained in step (3) was cooled to room temperature, and ground in a planetary ball mill to obtain a luminescent composite material InP/Al$_2$O$_3$ with a particle size less than 80 μm.

b. (1) Aluminum isopropoxide powder was spread in an alumina crucible, and was placed in a tube furnace for calcination at 800° C. for 10 min under a nitrogen atmosphere; then the calcined aluminum isopropoxide powder was annealed in a box furnace in air at 500° C. for 60 min;

(2) 380 mg of the calcined aluminum isopropoxide powder product obtained in step (1), 103.5 mg (0.373 mmol) of InO and 110 μL: (0.373 mmol) of tris(diethylamino)phosphine were added into a planetary ball mill and were fully ground to obtain a uniform mixture;

(3) the uniform mixture obtained in step (2) was placed in a tube furnace under a nitrogen atmosphere for calcination at 800° C. for 10 min under a protection of a reducing atmosphere produced from adequate activated carbon; and (4) the calcined mixture obtained in step (3) was cooled to room temperature, and ground in a planetary ball mill to obtain a luminescent composite material InP/Al$_2$O$_3$ with a particle size less than 80 μm.

EXAMPLE 16

Preparation of a Luminescent Composite Material CuInS$_2$/Al$_2$O$_3$ (1) Aluminum isopropoxide powder was spread in an alumina crucible, and was placed in a tube furnace for calcination at 800° C. for 10 min under a nitrogen atmosphere; then the calcined aluminum isopropoxide powder was annealed in a box furnace in air at 500° C. for 60 min;

(2) 380 mg of the calcined aluminum isopropoxide powder product obtained in step (1), 71.0 mg (0.373 mmol) of CuI, 103.5 mg (0.373 mmol) of InO and 12.0 mg (0.373 mmol) of sulfur powder were added into a planetary ball mill and were fully ground to obtain a uniform mixture;

(3) the uniform mixture obtained in step (2) was placed in a tube furnace under a nitrogen atmosphere for calcination at 800° C. for 10 min under a protection of a reducing atmosphere produced from adequate activated carbon; and (4) the calcined mixture obtained in step (3) was cooled to room temperature, and ground in a planetary ball mill to obtain a luminescent composite material CuInS$_2$Al$_2$O$_3$ with a particle size less than 80 μm.

It should be noted that the above-mentioned embodiments are illustrative, and any changes and modifications without departing from the spirit of the present invention should fall in the protection scope of the present invention.

What is claimed is:

1. A method for preparing a luminescent composite material, comprising:
    (1) mixing at least one precursor of a quantum dot and an oxide or a precursor thereof in solid phase followed by grinding to obtain a uniform mixture; wherein a molar ratio of the at least one precursor of the quantum dot to the oxide or precursor thereof is 1:1-100;
    (2) calcining the uniform mixture obtained in step (1) in a nitrogen atmosphere at 500-1000° C. for 5-60 min;
    (3) cooling the calcined mixture obtained in step (2) to room temperature; and
    grinding the mixture to obtain a luminescent composite material having a particle size less than 80 μm; and
    (4) annealing the grinded mixture obtained in step (3) in air at 400-600° C. for 5-60 min to obtain the luminescent composite material.

2. The method of claim 1, wherein before step (1), the oxide or precursor thereof is calcined in a nitrogen atmosphere at 500-1000° C. for 5-60 min; and in step (2), a reducing atmosphere is further used for calcination.

3. The method of claim 1, wherein before step (1), the oxide or precursor thereof is calcined in a nitrogen atmosphere at 500-1000° C. for 5-60 min, and the calcined oxide or precursor thereof is annealed in air at 400-600° C. for 5-60 min; and in step (2), a reducing atmosphere is further used for calcination.

4. The method of claim 2, wherein the reducing atmosphere is produced from activated carbon.

5. The method of claim 3, wherein the reducing atmosphere is produced from activated carbon.

6. The method of claim 1, wherein the at least one precursor of the quantum dot comprises an AX precursor and a BX$_2$ precursor; wherein A is selected from the group consisting of Li, Na, K, Rb, Cs, Ca, Sr and Ba, and B is selected from the group consisting of Al, Ga, In, Ge, Sn, Pb, Cu, Mn, Sb and Bi; X is selected form the group consisting of F, Cl, Br and I; and a molar ratio of the AX precursor to the BX$_2$ precursor is 1:1.

7. The method of claim 1, wherein the at least one precursor of the quantum dot comprises a cation precursor and an anion precursor; a molar ratio of the cation precursor to the anion precursor is 1:1;
    the cation precursor provides a cation $D^{n+}$ for the quantum dot, wherein n is an integer of 1-10; the cation precursor is an oxide, a nitride, a phosphide, a sulfide, a selenide, a hydrochloride, an acetate, a carbonate, a sulfate, a phosphate, a nitrate or a hydrate of an element selected from the group consisting of Zn, Cd, Hg, Al, Ga and In; and
    the anion precursor provides an anion $Y^{n-}$ for the quantum dot, wherein n is an integer of 1-10; and the anion precursor is a simple substance or an inorganic salt of an element selected from the group consisting of S, Se, Te, N, P, As and Sb.

8. The method of claim 1, wherein the at least one precursor of the quantum dot comprises a first precursor, a second precursor and a third precursor;

wherein the first precursor provides a monovalent cation for the quantum dot, and is selected from the group consisting of CuCl, CuBr, CuI, AgCl, AgBr, AgI, Cu$_2$S, Cu$_2$Se, Ag$_2$S, Ag$_2$Se, CU$_2$Te, Ag$_2$Te and combinations thereof;

the second precursor provides a trivalent cation for the quantum dot, and is an oxide, a sulfide, a selenide, a formate, an acetate, a propionate, a carbonate, a sulfate, a nitrate or a phosphate of a metal selected from the group consisting of In, Ga and Al;

the third precursor provides a divalent anion for the quantum dot, and is a simple substance or an inorganic salt of an element selected from the group consisting of S, Se and Te; and a molar ratio of the first precursor to the second precursor to the third precursor is 0.5: 0.5:1.

9. The method of claim 1, wherein the oxide or precursor thereof is selected from the group consisting of an oxygen-containing aluminum compound, an oxygen-containing silicon compound, an oxygen-containing zirconium compound, an oxygen-containing titanium compound, an oxygen-containing tin compound, an oxygen-containing zinc compound, an oxygen-containing molybdenum compound, an oxygen-containing lanthanum compound, an oxygen-containing cerium compound and an oxygen-containing samarium compound.

10. The method of claim 9, wherein the oxygen-containing aluminum compound is selected from the group consisting of aluminum oxide, aluminum isopropoxide, aluminum oxalate, basic aluminum acetate, aluminum acetylacetonate, aluminum sulfate, aluminum nitrate, aluminum carbonate, aluminum phosphate, magnesium aluminum hydrotalcite and combinations thereof;

the oxygen-containing silicon compound is selected from the group consisting of silicon dioxide, tetramethyl silicate, tetraethyl silicate, sodium silicate, calcium silicate and combinations thereof;

the oxygen-containing zirconium compound is selected from the group consisting of zirconium dioxide, zirconium propoxide, zirconium butoxide, zirconium acetate, zirconium acetylacetonate, zirconium sulfate, zirconium nitrate, zirconium hydrogen phosphate and combinations thereof;

the oxygen-containing titanium compound is selected from the group consisting of titanium dioxide, tetrapropyl titanate, tetrabutyl titanate, strontium titanate, zinc titanate and combinations thereof;

the oxygen-containing tin compound is selected form the group consisting of tin dioxide, tin acetate, tin isopropoxide and combinations thereof;

oxygen-containing zinc compound is selected from the group consisting of zinc oxide, zinc citrate, zinc acetate, zinc oxalate, zinc carbonate, zinc sulfate, zinc phosphate, zinc nitrate and combinations thereof;

the oxygen-containing molybdenum compound is selected from the group consisting of molybdenum oxide, molybdenum acetylacetonate, zinc molybdate, calcium molybdate, potassium molybdate and combinations thereof;

the oxygen-containing lanthanum compound is selected from the group consisting of lanthanum oxide, lanthanum nitrate, lanthanum acetylacetonate, lanthanum carbonate, lanthanum acetate, lanthanum phosphate, lanthanum sulfate, lanthanum oxalate, lanthanum titanate and combinations thereof;

the oxygen-containing cerium compound is selected from the group consisting of cerium oxide, cerium nitrate, cerium sulfate, cerium oxalate, cerium acetate, cerium carbonate, cerium phosphate and combinations thereof; and/or the oxygen-containing samarium compound is selected from the group consisting of samarium oxide, samarium nitrate, samarium acetate, samarium sulfate, samarium carbonate, samarium oxalate, samarium phosphate and combinations thereof.

\* \* \* \* \*